(12) United States Patent
Bierma

(10) Patent No.: US 7,080,842 B2
(45) Date of Patent: Jul. 25, 2006

(54) DEVICE FOR CLIMBING STAIRS FOR A WHEELCHAIR

(76) Inventor: Jochum Bierma, Schablederweg 54 A 4040, Linz (AT)

( * ) Notice: Subject to any disclaimer, the term of this patent is extended or adjusted under 35 U.S.C. 154(b) by 0 days.

(21) Appl. No.: 11/109,112

(22) Filed: Apr. 19, 2005

(65) Prior Publication Data

US 2005/0248105 A1   Nov. 10, 2005

(30) Foreign Application Priority Data

Apr. 19, 2004   (AT) ............................... A 670/2004
Oct. 20, 2004   (AT) ............................... A 1760/2004

(51) Int. Cl.
*B60S 9/00*   (2006.01)
(52) U.S. Cl. .................... 280/5.24; 280/DIG. 10; 180/11
(58) Field of Classification Search ................ 280/5.2, 280/5.24, DIG. 10; 180/11, 8.1–8.3
See application file for complete search history.

(56) References Cited

U.S. PATENT DOCUMENTS

| 3,052,323 A | * | 9/1962 | Hopfeld ...................... 280/5.2 |
| 4,771,839 A | * | 9/1988 | Misawa ............... 280/DIG. 10 |
| 5,277,436 A | * | 1/1994 | Frank et al. ................. 280/5.2 |

FOREIGN PATENT DOCUMENTS

GB   2274264   *   7/1994

\* cited by examiner

*Primary Examiner*—Paul N. Dickson
*Assistant Examiner*—Matthew Luby
(74) *Attorney, Agent, or Firm*—Collard & Roe, P.C.

(57) ABSTRACT

A device for climbing stairs for a wheelchair having a chassis (1) having a lifting device (3) and having receivers (17, 18) for the running wheels (16) of the wheelchair on arms running transversely to the wheel axles laterally next to the chassis (1) is described. In order to provide advantageous construction conditions, it is suggested that the arms each form at least one bow (10), which is mounted so it is pivotable around a transverse axis (11) positioned in a frame (7) from a stop-delimited pivoted-out position into a positioned pivoted in against the frame (7), and the frame (7), which is linked laterally to the chassis (1) around a longitudinal axis (8), may be folded up from a stop-delimited, folded-down operating position into a rest position.

7 Claims, 5 Drawing Sheets

DEVICE FOR CLIMBING STAIRS FOR A WHEELCHAIR

CROSS REFERENCE TO RELATED APPLICATIONS

Applicant claims priority under 35 U.S.C. §119 of Austrian Application Nos. A 670/2004, filed Apr. 19, 2004 and A 1760/2004 filed Oct. 20, 2004.

FIELD OF THE INVENTION

The present invention relates to a device for climbing stairs for a wheelchair having a chassis having a lifting device and having receivers for the running wheels of the wheelchair on arms running transversely to the wheel axles laterally next to the chassis.

DESCRIPTION OF THE PRIOR ART

Devices for climbing stairs for wheelchairs have a chassis, provided with wheels, that receives a lifting device having a support foot which may be raised and lowered, for example, which is placed on a step and raises or lowers the chassis to the next step depending on the travel direction. The chassis is controlled by hand via a slide guide having handles, which carries control switches to actuate the electrical drive of the lifting device. To connect the stair climbing device to a wheelchair, a holder for receiving the chassis of the stair climbing device is provided on the chair frame, which is secured in the holder with the aid of a quick-release lock. However, the running wheels of the wheelchair must be removed to use the stair climbing device. In order to be able to use a stair climbing device independently of a holder for the chassis on the wheelchair, attaching a carrier for two arms running laterally next to the chassis in its longitudinal direction to the chassis of the stair climbing device is also known, these arms being provided with receivers for the running wheels of the wheelchair, so that a wheelchair may be pushed with its running wheels into these receivers and clamped to the slide guide of the chassis of the stair climbing device using a simple clamping device. The wheelchair is thus supported via its running wheels and the lateral arms so it dissipates load onto the chassis of the stair climbing device, with the advantage that no separate holder for receiving the stair climbing device is to be provided on the wheelchair and removal of the running wheels of the wheelchair is not necessary to use the stair climbing device. However, the known stair climbing devices having lateral receivers for the running wheels of the wheelchair have the disadvantage that the carrier having the two lateral arms for the receivers must be removed in each case from the chassis in order to be able to store the stair climbing device in a space-saving way, as is necessary for transport in a vehicle, for example.

SUMMARY OF THE INVENTION

The present invention is thus based on the object of designing a device for climbing stairs for a wheelchair of the type described at the beginning in such a way that in spite of the lateral extension of the arms necessary for the wheel support of the wheelchair, a space-saving transport position is made possible without having to remove the arms from the chassis.

The present invention achieves the stated object in that the arms each form at least one bow, which is mounted so it may be pivoted around a transverse axis positioned in a frame from a stop-delimited pivoted-out position into a pivoted-in position against the frame, and the frame linked laterally to the chassis around a longitudinal axis may be folded up from a folded-down operating position delimited by a stop into a rest position.

Since, as a result of these measures, the arms having the receivers for the running wheels of the wheelchair form at least one bow which is held delimited by a stop in its pivoted-out position in a frame, a sufficiently rigid construction results for the load dissipation onto the chassis of the stair climbing device. Specifically, the bows have the running wheels of the wheelchair applied to them like a stop. When the particular bow is pivoted in against the frame, not only is a flat construction for folding up the frame into the rest position achieved, but rather also a shortening of the arms essentially to the frame length, so that after the frame is folded up with the pivoted-in bows, a rest position is made possible which hardly increases the space required for storing the chassis, because the width of the chassis is only increased by the folded-up frame.

If two bows are provided in each case for the arms on both sides for receiving the running wheels, which are mounted so they are pivotable around transverse axes positioned in a frame at a mutual interval in the longitudinal direction of the chassis, adaptation to different diameter ranges of the running wheels may additionally be made possible. Specifically, when the particular front bow is pivoted against the associated frame, pushing a wheelchair having smaller running wheels into the wheel receivers is made easier. In addition, a frame-side wheel receiver, which has a shorter distance to the wheel receiver of the rear bow, tailored to the smaller running wheel diameter, may act. To push the wheelchair into the wheel receivers, because of the pivoted-in front bow, the chassis of the stair climbing device has to be tipped forward only slightly or not at all. Because of the mutual interval of the transverse axes to the mounting of the two bows of each arm, when the bows are pivoted in against the frame, shortening of the arms essentially to the frame length is also ensured.

Especially simple construction conditions result if the bows of the arms on both sides have two parallel webs mounted at an interval from one another on the transverse axes, which are connected at their ends by spacers forming wheel receivers. The webs of the bows may form lateral guides for the running wheels of the wheelchair in this case and, in addition, offer advantageous conditions for a space-saving pivoting together of two bows, because for this purpose, only the outer interval of the two webs of one bow has to be selected smaller than the inner interval of the webs of the other of the two bows mounted in one frame in order to allow the bows to interlock when they are pivoted in against the frame. If the spacer of the particular front bow is implemented as an ascent ramp for a running wheel of the wheelchair, pushing the wheelchair into the lateral wheel receivers is additionally made easier.

If a simpler construction having only one bow per arm is used, to make it easier to ascend onto the arms, an ascent ramp may be provided, which is implemented as a double-armed lever and is mounted in the frame so it is pivotable around a transverse axis at a distance in the longitudinal direction of the chassis in front of the particular bow and is delimited by a stop, so that when the running wheels of the wheelchair roll over it, this ascent ramp is pivoted into a position in which the transverse axes carrying the ascent ramp may form a buttress for dissipating the weight load due to the wheelchair onto the frame.

Advantageous construction conditions for the stop-delimited pivoted-out position of the bows may be provided if the stops for the two bows of the arms on both sides each comprise a transverse spar of the frame, the transverse spar for the stop of the rear bow lying outside the two transverse axes for mounting the two bows and the transverse spar for the top of the front bow, which is extended above the transverse axis receiving it, lying between the two transverse axes. The transverse spar lying between the two transverse axes for mounting the bows does require an extension of the front bow above the transverse axis receiving it, in order to be able to act as a stop for this bow, but this transverse spar may advantageously be used as a receiver for running wheels of the wheelchair. This is not necessary for the transverse spar for the stop of the rear bow. For this reason, this transverse spar is positioned outside the transverse axes for mounting the two bows, so that the space required for pivoting in the bows against the frame is not restricted.

BRIEF DESCRIPTION OF THE DRAWING

The subject matter of the present invention is illustrated for exemplary purposes in the drawing.

DESCRIPTION OF THE PREFERRED EMBODIMENT

Figure 1:
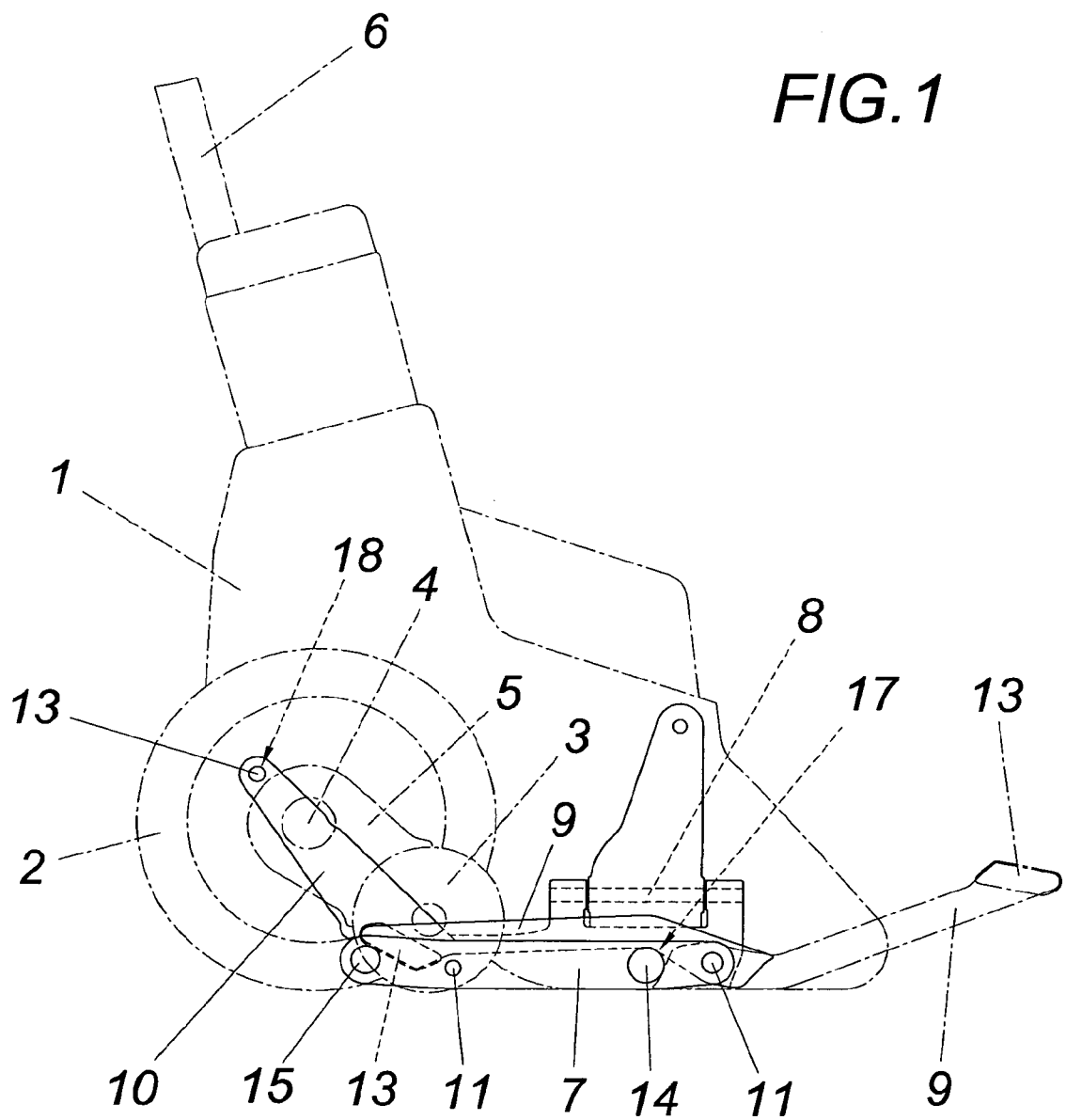
FIG. 1 shows a device for climbing stairs for a wheelchair according to the present invention in a schematic side view.
Figure 2:
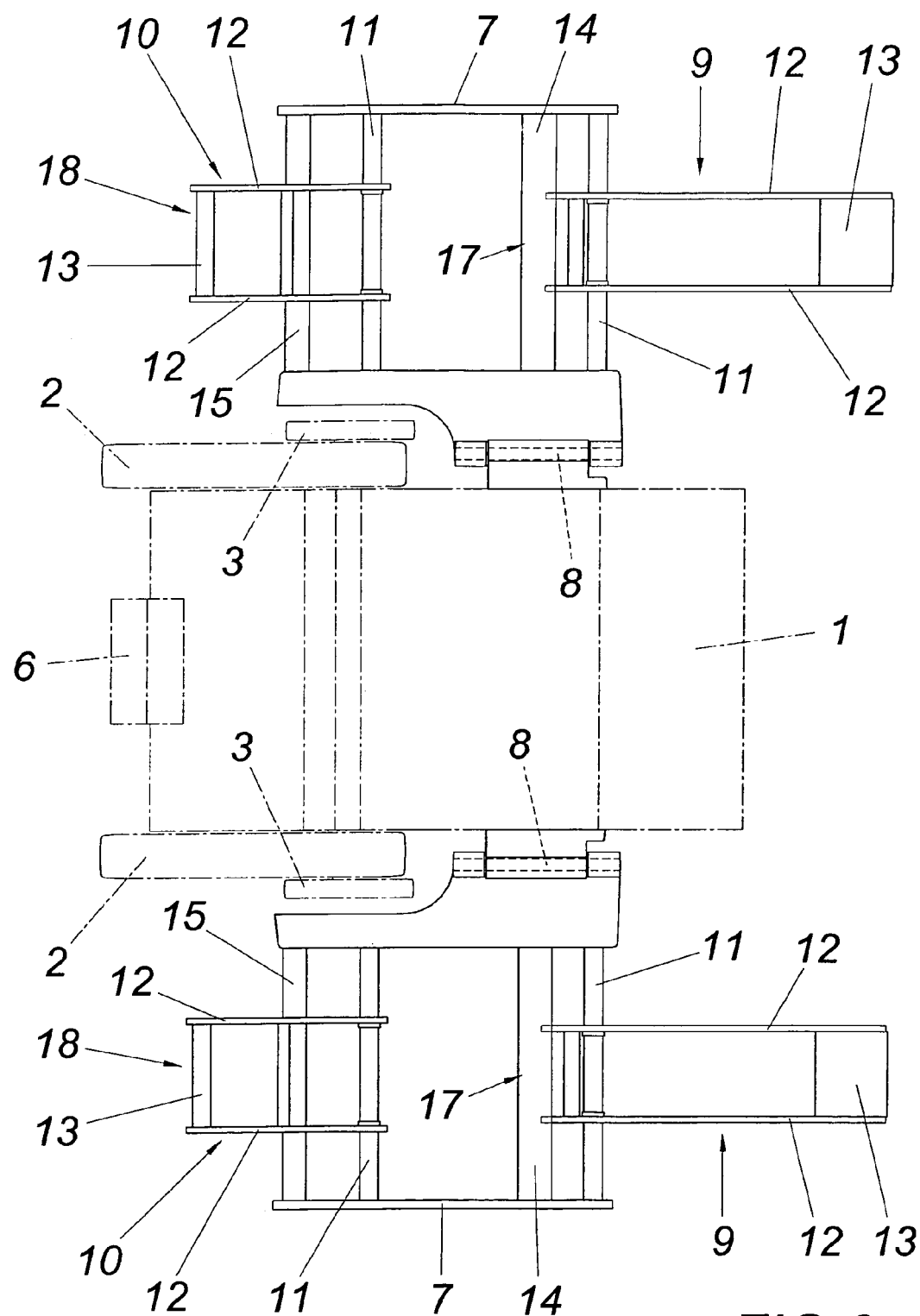
FIG. 2 shows this stair climbing device in a top view.

The stair climbing device according to the exemplary embodiment in FIGS. 1 through 5 has a chassis 1 having wheels 2 on both sides and a lifting device (not shown in greater detail), in order to raise or lower the device in a known way to the next stair step via a support foot which may be placed on the particular next stair step. With the aid of rollers 3, which are mounted on a lever 5 pivotable around an axis 4, unintentional rolling off from a stair step is prevented, because the wheels 2 are braked when the rollers 3 fall down. A sliding guide 6, which is provided with handles on its upper end and comprises a spar detachably connected to the chassis 1, is used to guide the chassis 1.

Figure 3:
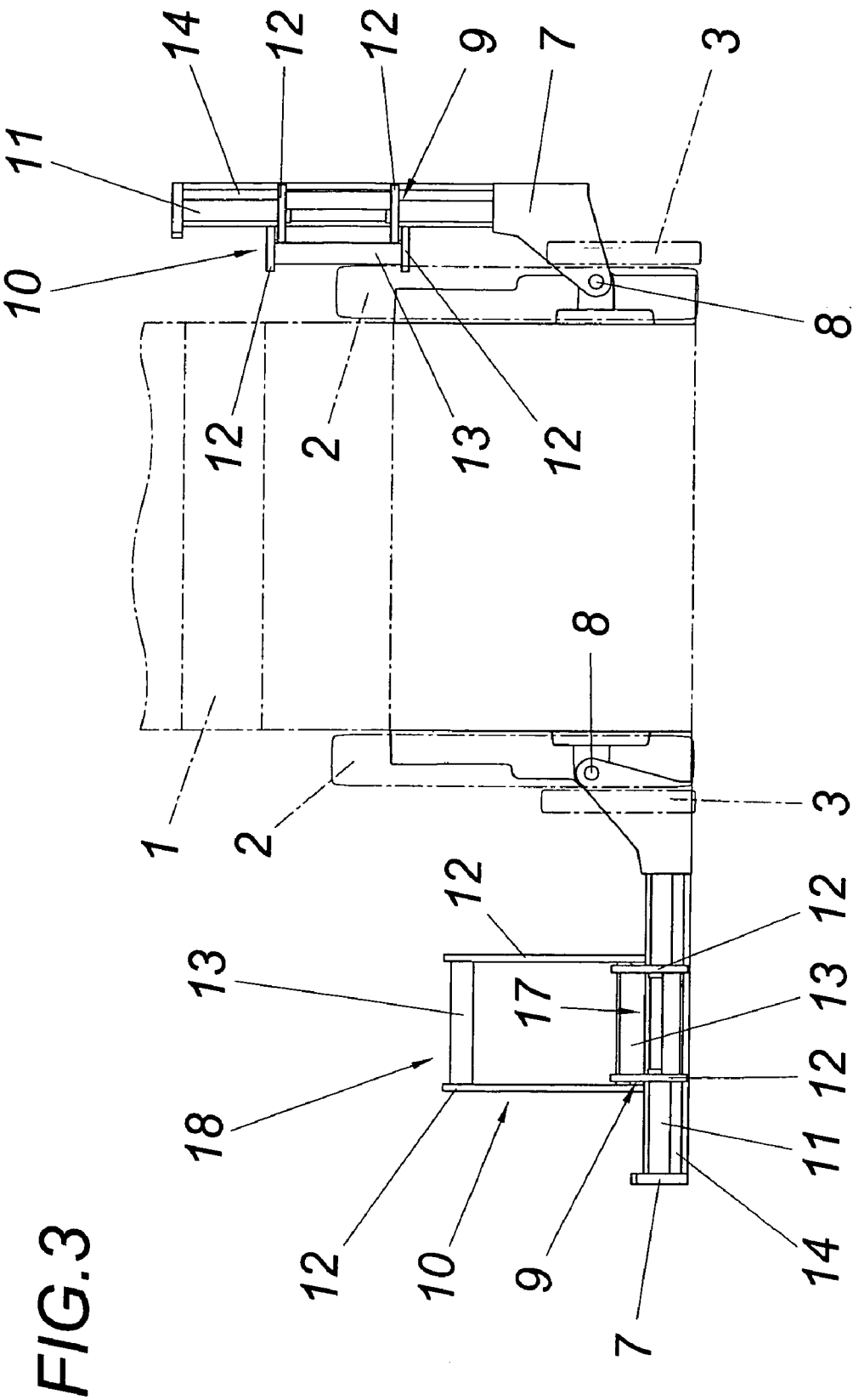
FIG. 3 shows the stair climbing device in front view.

Frame 7 is linked to the lateral parts of the chassis 1 to receive a wheelchair, with the aid of a linkage axis 8 running in the longitudinal direction of the chassis 1. The frame 7 may therefore be folded up from a stop-delimited folded-down position into a rest position, as may be inferred from FIG. 3. Two bows 9 and 10 are each mounted in the frame 7 so they are pivotable around transverse axes 11. These bows 9, 10 have two webs 12 positioned at an interval from one another, which are connected at their ends by spacers 13. The bows 9, 10 stop on the transverse bars 14 and 15 of the frame 7 in the pivoted-out position. While the transverse spar 15 lies outside the two transverse axes 11, the transverse spar 14 is positioned between the two transverse axes 11, which requires an extension of the bows 9 beyond the transverse axes 11 which receive them. Since the inner interval of the leg 12 of the rear bow 10 is selected larger than the outer interval of the leg 12 of the front bow 9, the bows 9, 10 may be pivoted in to overlap one another against the frame 7 from their pivoted-out stop position, as is indicated in FIG. 3. In the region of the right frame 7 in the travel direction, which is shown in the folded-down stop position, the front bow 9 is illustrated pivoted in against the frame 7. For the frame 7 folded up into the rest position on the left side of the chassis 1, the pivoted-in bows 9, 10 engage in one another, so that the chassis 1 is only insignificantly broadened by the frame 7 folded up into the rest position.

Figure 4:
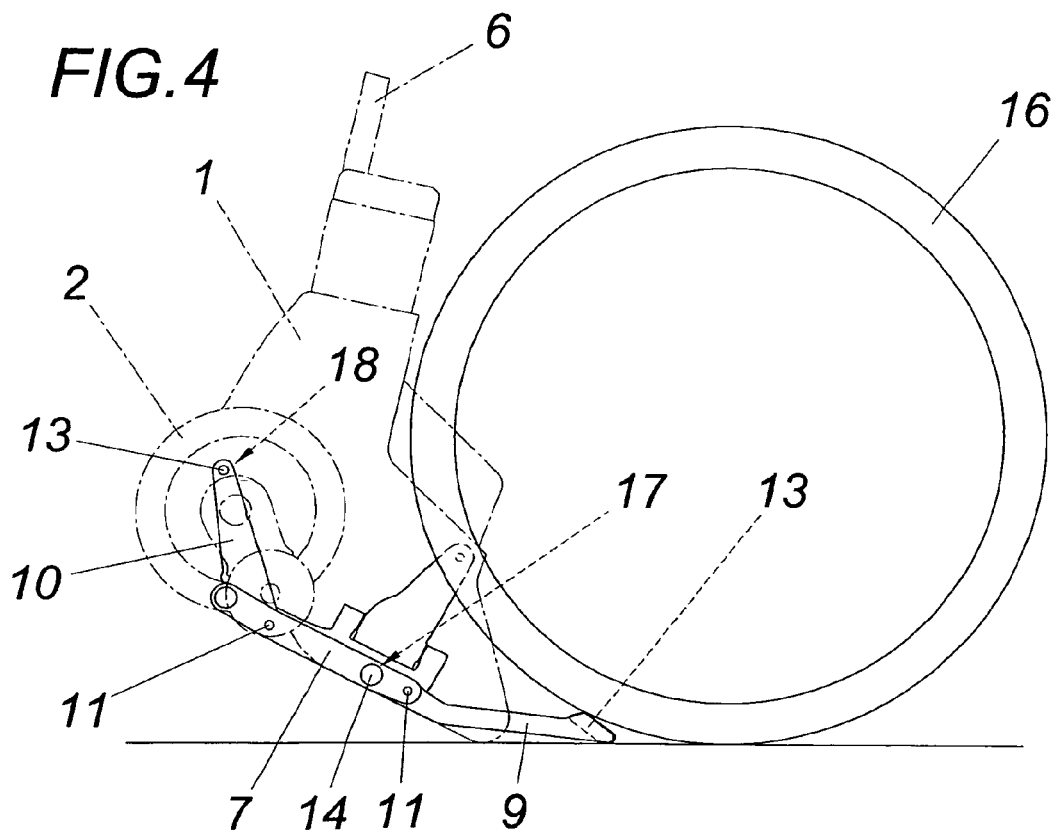
FIGS. 4 and 5 show the stair climbing device in a schematic side view in two different usage positions in a smaller scale.

As shown in FIG. 4, in which the bows 9, 10 are pivoted out into the stop position, the chassis 1 is tilted forward, so that the front bow 9 makes it easier to push on the running wheel 16 of a wheelchair (not shown in greater detail). For this purpose, the spacer 13 of the front bow 9 forms an ascent ramp, so that the running wheel 16 may be rolled over this ascent ramp to the receivers 17 and 18, which are formed by the transverse spar 14 for the stop of the front bow 9 and by the spacer 13 of the rear bow 10 and are supplemented by the spacer 13 of the front bow. The chassis 1 may be clamped in a typical way to the sliding guide 6 by a clamping device after the running wheels 16 of a wheelchair are pushed into the bows 9, 10, in order to lift up the wheelchair as shown in FIG. 5 by tilting the chassis 1 backward and travel via the chassis 1 and/or its lifting device 3.

Figure 5:
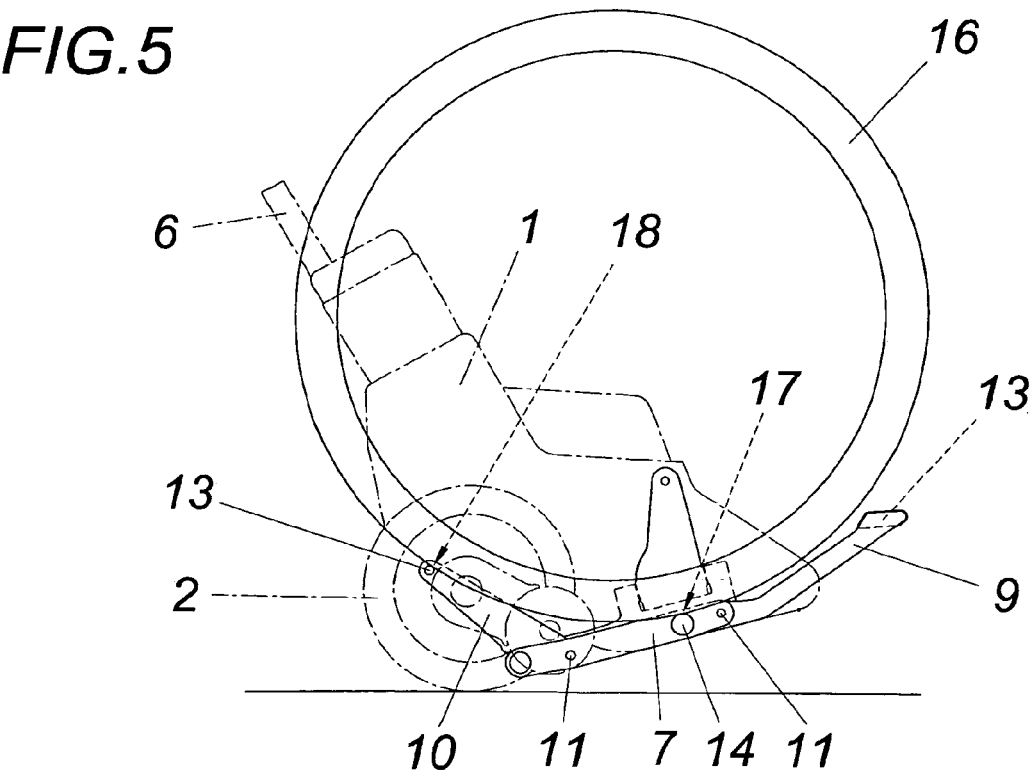

The pivoted-out position of the front bows 9 shown in FIGS. 4 and 5 is only used with wheelchairs having running wheels in a large diameter range, however. Running wheels in a smaller diameter range do not require the pivoted-out front bows 9 to receive them. The front bows 9 are therefore pivoted in from the pivoted-out position indicated with a dot-dash line into the position against the frame 7 shown with a solid line for wheelchairs having smaller running wheels, as shown in FIG. 1, so that the chassis 1 does not have to be tilted forward to receive the running wheels. The receivers 17 and 18 suffice in this case to securely support the wheelchair via its running wheels if the wheelchair is appropriately clamped to the sliding guide 6.

Figure 6:
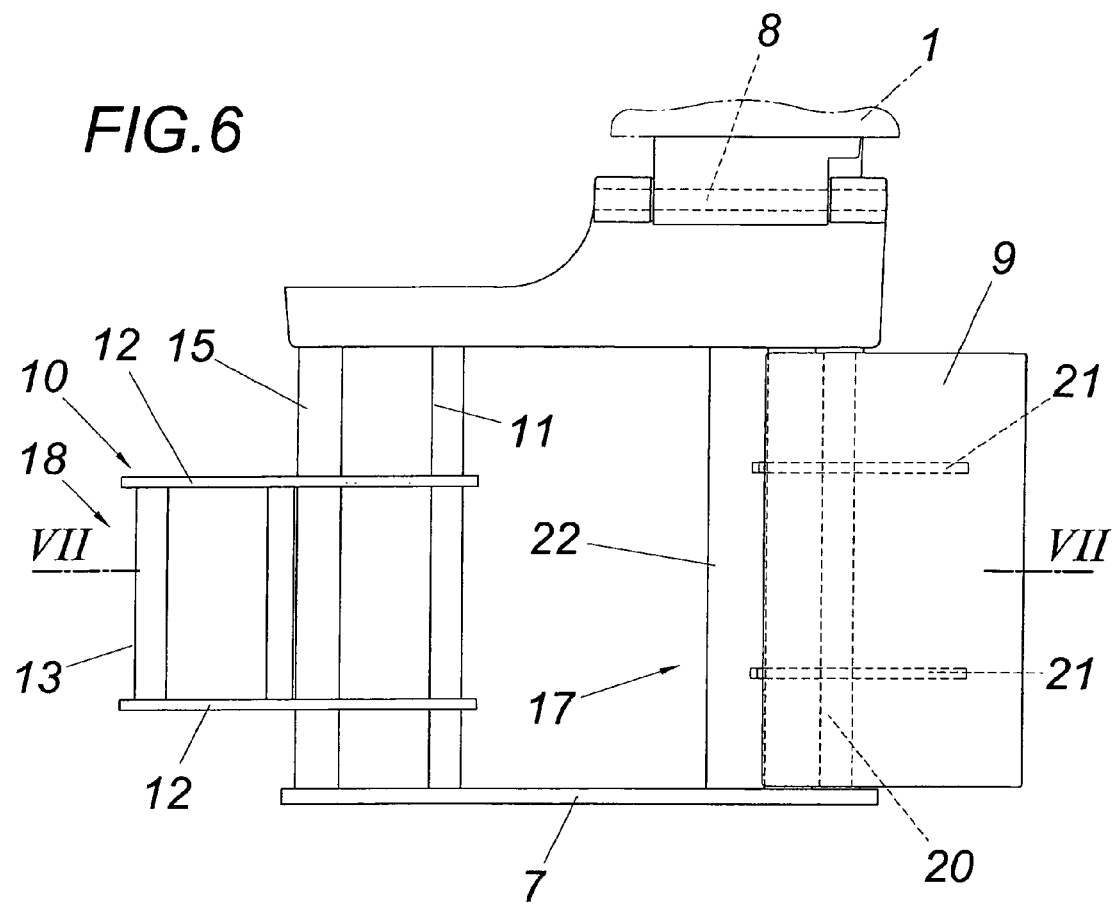
FIG. 6 shows a top view of the folded-down frame of a construction variation in a larger scale.
Figure 7:
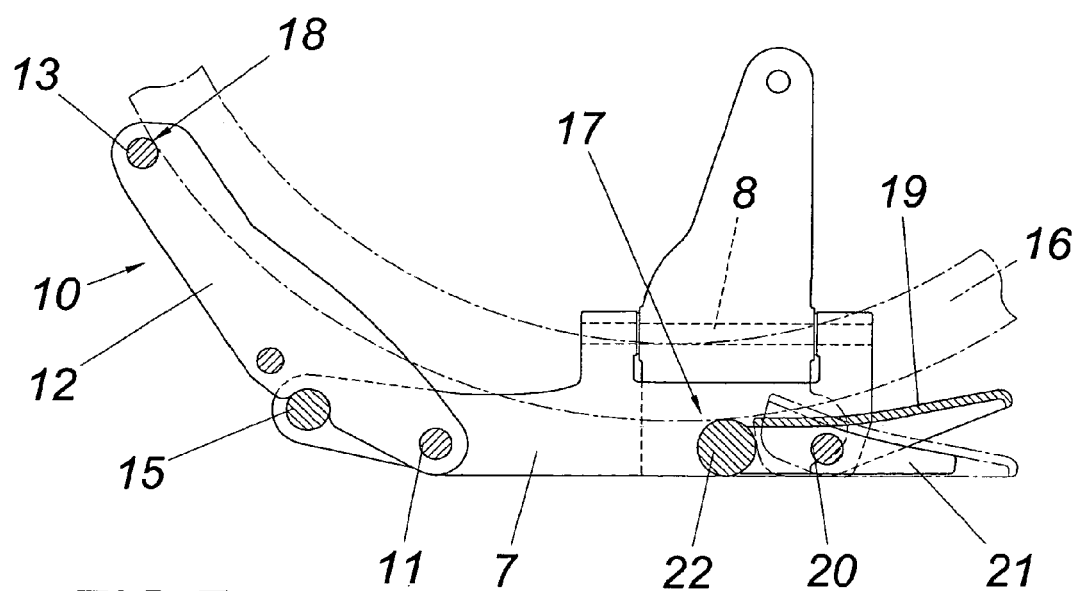
FIG. 7 shows a section along the line VII—VII of FIG. 6.

The embodiment shown in FIGS. 6 and 7 is restricted to receiving wheelchairs whose running wheels 16 manage without the front bows 9, which are therefore dispensed with, providing especially simple construction conditions. The ascent of the running wheel 16 onto the frame 7 to be supported on the receivers 17, 18 is made easier by an ascent ramp 19, which is mounted so it is pivotable, delimited by stop, around a transverse axis 20 of the frame 7, as may be inferred from FIG. 7 in particular, provided instead of the bow 9. This ascent ramp 19 rests on support levers 21, which are mounted on the transverse axis 20 and are supported on a transverse spar 22, in the pivoted-down position indicated by a dot-dash line in FIG. 7. Since the ascent ramp 19 represents a two-arm lever in relation to the transverse axis 20, the ascent ramp 19 is pivoted up into the position shown in solid lines when the running wheels 16 travel over it, so that the transverse axis 20 may also be used as a support for the running wheels 16, which allows the running wheel diameter to be increased in comparison to the receivers 17, 18.

What is claimed is:

1. A device for climbing stairs for a wheelchair having a chassis having a lifting device and having receivers for the running wheels of the wheelchair on arms running transversely to the wheel axles laterally next to the chassis, wherein the arms each form at least one bow (10), which is mounted so it is pivotable around a transverse axis (11) positioned in a frame (7) from a stop-delimited pivoted-out position into a positioned pivoted in against the frame (7), and the frame (7), which is linked laterally to the chassis (1) around the longitudinal axis (8), may be folded up from a stop-delimited, folded-down operating position into a rest position.

2. The device according to claim 1, wherein the arms each form two bows (9, 10) which are mounted so they are pivotable around transverse axes (11) positioned in a frame (7) at a mutual interval in the longitudinal direction of the chassis (1).

3. The device according to claim 1, wherein the bows (9, 10) of the arms on both sides have two parallel webs (12), mounted at an interval from one another on the transverse axes (11), which are connected at their ends by spacers (13) forming wheel receivers (17).

4. The device according to claim 2, wherein the outer interval of the two webs (12) of one bow (9) is smaller than the inner interval of the webs (12) of the other of the two bows (9, 10) mounted in a frame (7).

5. The device according to claim 2, wherein the spacer (13) of each of the front bows (9) forms an ascent ramp.

6. The device according to claim 1, wherein an ascent ramp (19), implemented as a double-arm lever, is mounted so it is pivotable, delimited by a stop, around a transverse axis (20), in the frame (7) at an interval in the longitudinal direction of the chassis (1) in front of the bow (10).

7. The device according to claim 1, wherein the stops for the two bows (9, 10) of the arms on both sides each comprise a transverse spar (14, 15) of the frame (7), the transverse spar (15) for the stop of the rear bow (10) lying outside the two transverse axes (11) for mounting the two bows (9, 10) and the transverse spar (14) for the stop of the front bow (9), extending beyond the transverse axis (11) which receives it, lying between the two transverse axes.

* * * * *